Nov. 7, 1933.  C. A. SPAHN  1,934,014
SOLDERING KIT RECEPTACLE
Filed May 18, 1932
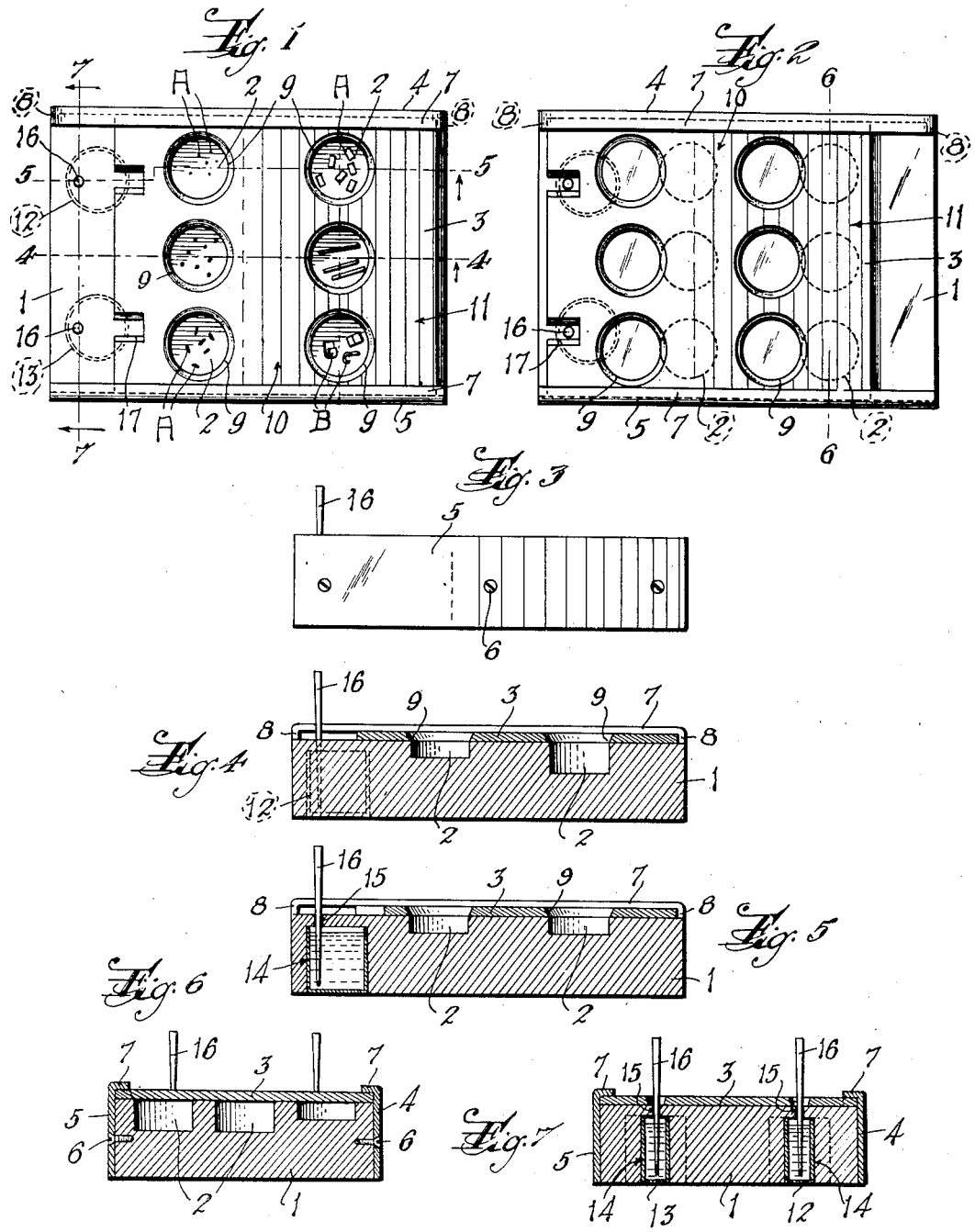
INVENTOR.
Charles A. Spahn,
BY
ATTORNEYS.

Patented Nov. 7, 1933

1,934,014

UNITED STATES PATENT OFFICE 1,934,014

SOLDERING KIT RECEPTACLE

Charles A. Spahn, Newark, N. J., assignor to The J. M. Ney Company, Hartford, Conn., a corporation of Connecticut Application May 18, 1932. Serial No. 611,984

5 Claims. (Cl. 206—1)

This invention relates in general to receptacles and more particularly to a receptacle for a soldering kit such as used by orthodontists and others whose work requires the soldering together of small parts.

In the practice of orthodontia it is frequently necessary to assemble and solder together several extremely small parts to produce a tooth straightening appliance. Several soldering operations may be required to make a certain appliance and the solder is supplied in extremely small pieces of various sizes depending upon the requirements for a small or large amount of solder for a particular soldering operation. Both the parts to be soldered and the solder, are formed of precious metal, and because of this, the number of pieces of solder and parts required to be assembled and handled and the extremely small size of the pieces of solder and the parts, it is highly desirable that means be provided for keeping the solder pieces and the parts to be soldered together in an orderly and accessible manner, and to protect them against loss and accumulation of dust or other foreign matter and against becoming mixed with parts of other appliances or pieces of solder for other purposes.

Therefore one object of my invention is to provide a receptacle embodying novel and improved features of construction including a plurality of compartments each to receive a plurality of pieces of solder or parts to be soldered, and a cover to normally close said compartments, whereby a plurality of pieces of solder and parts to be soldered of each of a plurality of sizes and types respectively can be conveniently and easily accessibly stored and handled in proper order and protected against loss and accumulations of dust or other foreign matter.

Another object is to provide a receptacle of this character embodying novel and improved features of construction wherein the cover shall be permanently and inseparably connected to the body of the receptacle and whereby said compartments can be opened and closed by simple sliding of the cover in opposite directions.

Other objects are to provide such a receptacle including a block of suitable material, for example, wood, metal, bakelite or other composition of matter, having a plurality of recesses in the top thereof providing compartments to receive pieces of solder and parts to be soldered, and a cover slidably mounted on and in contact with the top surface of said block and having an opening for each of said recesses, said openings to simultaneously register with said recesses when the cover is in one position and said cover having portions to simultaneously close all of said recesses when the cover is in another position; to provide novel and improved means for limiting sliding movement of said cover in both directions, into both of said positions; to provide novel and improved means for mounting said cover on said block; to provide in such a receptacle novel and improved means for holding flux; and to obtain other advantages and results as will be brought out by the following description.

Referring to the accompanying drawing in which corresponding and like parts are designated throughout the several views by the same reference characters, Figure 1 is a top plan view of a soldering kit receptacle embodying my invention, showing the cover plate in open position.

Figure 2 is a similar view showing the cover plate in closed position.

Figure 3 is a side elevation of the receptacle.

Figures 4 and 5 are vertical longitudinal sectional views on the lines 4—4 and 5—5 respectively of Figure 1.

Figure 6 is a transverse vertical sectional view on the line 6—6 of Figure 2, and Figure 7 is a similar view on the line 7—7 of Figure 1.

Specifically describing the illustrated embodiment of the invention, the reference character 1 designates the body of the receptacle which is shown in the form of a rectangular block of suitable material, for example, wood, metal, bakelite or other composition. A plurality of recesses 2 are formed in the top of the block which serve as compartments to receive pieces of solder and parts to be soldered. These recesses may be of any suitable shape and size, but are shown in Figures 4 and 5 as circular and of different depths to accommodate pieces or parts of different sizes. For example, some of the recesses may receive pieces of solder A which are of different sizes according to the amount of solder required for any particular operation, while the deeper recesses may be utilized to store parts B to be soldered. Also, the recesses are preferably arranged in rows extending transversely of the block, and as shown there are three recesses in each row. Corresponding recesses in adjacent rows are spaced apart a distance at least equal to or greater than the diameter of the recesses or the dimension of the recesses in the direction of the spacing thereof.

A cover plate 3 of suitable material, for example, metal, is slidable upon and in contact with the top surface of the block which is preferably flat and smooth. For mounting this cover plate upon the block, I have shown two guide strips 4 and 5 each of which is secured as by screws 6 to one of the opposite longitudinal sides of the block. Each guide strip has a flange 7 turned inwardly over the top surface of the block in spaced relation thereto so as to slidably receive the corresponding edge portion of the cover plate between the flange and the top surface of the block. For limiting sliding movement of the cover plate in both directions, one of the flanges 7 may be provided at its ends with downturned stop lugs 8 against which the ends of the cover plate may abut at the limits of the sliding movement of the cover plate.

The cover plate is provided with a plurality of openings 9, one for each recess or compartment 2, said openings being so arranged that they register with corresponding recesses when the cover plate is in one position at one limit of its sliding movement, as shown in Figure 1. The cover plate also has a portion 10 between the rows of openings 9 and another portion 11 at one side of the row of said openings, for simultaneously closing the openings when the cover plate is in another position at the other limit of its sliding movement. In other words, the portion 10 between the rows of openings closes the left hand row of recesses 2 in Figure 1, while the portion 11 closes the other row of recesses as clearly shown in Figure 2. Preferably the walls of the openings 9 in the cover plate are flared upwardly and any of the openings may serve as a finger grip for sliding the cover plate.

With this construction it will be observed that a plurality of pieces of solder A and parts B to be soldered of each of a plurality of sizes and types respectively, can be conveniently and easily accessibly stored in the recesses B and protected against loss and accumulations of dust or other foreign matter when the cover plate is closed. The various pieces of solder and parts are prevented from mixing with each other, and all pieces of a similar size or nature can be arranged in one recess. Access to all of the recesses may be had by a simple sliding of the cover plate.

The cover plate is inseparably connected to the block so that it is always in proper position to close the openings and cannot become displaced. Also it is always in an out-of-the-way position. The block being substantially flat and rectangular, is highly stable and cannot be easily tipped; and the block is also relatively thin so that it does not materially project above the surface of a bench or table in such a manner as to become an obstruction or hindrance to operations.

Preferably the block 1, at least the top surface and the bottoms of the recesses 2, is of a color contrasting with the color of the solder and parts to be soldered so that said solder and parts can be easily seen for removal from the recesses; for example where the solder and parts to be soldered are gold the bottoms of the recesses and also the top surface of the block are preferably black.

To complete the solder kit, I provide at one end of the block 1 a cup-shaped container 12 for flux and another cup-shaped container 13 for an anti-flux composition. As shown on the drawing these containers are frictionally fitted into the recesses 14 which open through the bottom of the block, and the top of the block is provided with openings 15 for access to the contents of the containers 12 and 13. In removing the flux or anti-flux from said containers, applicator rods 16 are utilized, these rods being normally arranged in the openings 15 so as to serve as closures therefor. To provide a clearance for said applicator rods as the cover plate is moved into its closed position, said cover plate may be provided with notches 17.

The invention provides a simple, compact and durable receptacle, and while I have shown the invention as embodied in certain details of construction, it should be understood that this is primarily for illustrating the principles of the invention and that many modifications and changes may be made in the details of construction without departing from the spirit or scope of the invention.

Having thus described my invention, what I claim is:

1. A soldering kit receptacle comprising a block having a plurality of recesses in the top thereof, a cover plate slidable in opposite directions upon and in contact with the top surface of the block and having openings to register with said recesses when the cover is in one position and portions to close said recesses when the cover is in another position, and means to limit sliding of said cover into said positions.

2. A soldering kit receptacle comprising a block having a plurality of recesses in the top thereof, a cover plate in contact with the top surface of said block, and a guide at each of opposite sides of said block engaging said cover plate for slidably mounting the latter on said block, said cover plate having openings to register with said recesses when the cover is in one position and portions to close said recesses when the cover plate is in another position.

3. A soldering kit receptacle comprising a block having a plurality of recesses in the top thereof, a cover plate in contact with the top surface of said block, and a guide at each of opposite sides of said block overhanging said cover plate for slidably mounting the latter on said block, said cover plate having an opening to register with each of said recesses when the cover is in one position and portions to close said recesses when the cover plate is in another position, and means to limit sliding of said cover into each of said positions.

4. A soldering kit receptacle comprising a block having a plurality of recesses in the top thereof, a cover plate in contact with the top surface of said block, a strip secured to each of opposite sides of said block and having a flange overhanging said top surface of the block to slidably receive one edge portion of said cover plate between said flange and said top surface, one of said flanges having a stop lug at each end thereof to limit sliding of said cover plate in both directions, and said cover plate having an opening to register with each of said recesses when the cover plate is in engagement with one stop lug and portions to close said recesses when the cover plate is in engagement with the other stop lug.

5. A soldering kit receptacle comprising a block having a recess in the bottom thereof and an opening in the top leading to the inner end of said recess, a container in said recess having its inner end open and communicating with said opening in the top of the block, and an applicator rod removably inserted through said opening into said container for both normally closing said opening and removing the contents of said container.

CHARLES A. SPAHN.